US008296304B2

(12) United States Patent
Fontoura et al.

(10) Patent No.: US 8,296,304 B2
(45) Date of Patent: Oct. 23, 2012

(54) METHOD, SYSTEM, AND PROGRAM FOR HANDLING REDIRECTS IN A SEARCH ENGINE

(75) Inventors: Marcus F. Fontoura, San Jose, CA (US); Andreas Neumann, Gilroy, CA (US); Runping Qi, Cupertino, CA (US); Eugene J. Shekita, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 10/764,771

(22) Filed: Jan. 26, 2004

(65) Prior Publication Data
US 2005/0165800 A1 Jul. 28, 2005

(51) Int. Cl.
*G06F 17/30* (2006.01)

(52) U.S. Cl. .................. 707/748; 707/741; 707/769

(58) Field of Classification Search .............. 707/1–10, 707/100–104.1, 200–205, 741, 748; 715/501.1; 709/201; 719/328
See application file for complete search history.

(56) References Cited

U.S. PATENT DOCUMENTS

| 4,965,763 | A | 10/1990 | Zamora |
| 5,187,790 | A | 2/1993 | East et al. |
| 5,265,221 | A | 11/1993 | Miller |
| 5,287,496 | A | 2/1994 | Chen et al. |
| 5,297,039 | A | 3/1994 | Kanaegami et al. |
| 5,423,032 | A | 6/1995 | Byrd et al. |
| 5,574,906 | A | 11/1996 | Morris |
| 5,638,543 | A | 6/1997 | Pedersen et al. |
| 5,664,172 | A | 9/1997 | Antoshenkov |
| 5,685,003 | A | 11/1997 | Peltonen et al. |
| 5,701,469 | A | 12/1997 | Brandli et al. |
| 5,708,825 | A | 1/1998 | Sotomayor |
| 5,721,938 | A | 2/1998 | Stuckey |
| 5,721,939 | A | 2/1998 | Kaplan |
| 5,724,033 | A | 3/1998 | Burrows |
| 5,729,730 | A | 3/1998 | Wlaschin et al. |
| 5,745,889 | A | 4/1998 | Burrows |
| 5,745,890 | A | 4/1998 | Burrows |
| 5,745,894 | A | 4/1998 | Burrows et al. |
| 5,745,898 | A | 4/1998 | Burrows |
| 5,745,899 | A | 4/1998 | Burrows |

(Continued)

FOREIGN PATENT DOCUMENTS
EP  0 809 197  11/1997

(Continued)

OTHER PUBLICATIONS

Macurious Software Foundation. *Macurious Spider Frequently Asked Questions 3.0* [online] [retrieved on Oct. 8, 2003]. Available from http://www.macurious.com/spider/faq.htm.

(Continued)

*Primary Examiner* — Shahid Alam
(74) *Attorney, Agent, or Firm* — Janaki K. Davda; Konrad Raynes & Victor LLP

(57) ABSTRACT

Disclosed is a method, system, and program for handling redirects in documents. At least one equivalence class that includes documents that are connected through a redirect. Cycles for each equivalence class are detected, wherein documents in a cycle are marked so that they are not indexed. Incomplete chains for each equivalence class are detected, wherein documents in an incomplete chain are marked so that they are not indexed. A representative for each equivalence class is selected.

30 Claims, 5 Drawing Sheets

U.S. PATENT DOCUMENTS

| | | |
|---|---|---|
| 5,745,900 A | 4/1998 | Burrows |
| 5,745,904 A | 4/1998 | King et al. |
| 5,745,906 A | 4/1998 | Squibb |
| 5,765,149 A | 6/1998 | Burrows |
| 5,765,150 A | 6/1998 | Burrows |
| 5,765,158 A | 6/1998 | Burrows |
| 5,765,168 A | 6/1998 | Burrows |
| 5,778,378 A | 7/1998 | Rubin |
| 5,787,435 A | 7/1998 | Burrows |
| 5,797,008 A | 8/1998 | Burrows |
| 5,809,502 A | 9/1998 | Burrows |
| 5,832,480 A | 11/1998 | Byrd, Jr. et al. |
| 5,832,500 A | 11/1998 | Burrows |
| 5,832,519 A | 11/1998 | Bowen et al. |
| 5,848,407 A | 12/1998 | Ishikawa et al. |
| 5,852,820 A | 12/1998 | Burrows |
| 5,862,325 A * | 1/1999 | Reed et al. ............... 709/201 |
| 5,864,863 A | 1/1999 | Burrows |
| 5,873,097 A | 2/1999 | Harris et al. |
| 5,884,305 A | 3/1999 | Kleinberg et al. |
| 5,890,103 A | 3/1999 | Carus |
| 5,893,119 A | 4/1999 | Squibb |
| 5,903,646 A | 5/1999 | Rackman |
| 5,903,891 A | 5/1999 | Chen et al. |
| 5,903,901 A | 5/1999 | Kawakura et al. |
| 5,909,677 A | 6/1999 | Broder et al. |
| 5,914,679 A | 6/1999 | Burrows |
| 5,915,251 A | 6/1999 | Burrows et al. |
| 5,920,859 A | 7/1999 | Li |
| 5,924,091 A | 7/1999 | Burkhard |
| 5,933,822 A | 8/1999 | Braden-Harder et al. |
| 5,963,940 A | 10/1999 | Liddy et al. |
| 5,963,954 A | 10/1999 | Burrows |
| 5,966,703 A | 10/1999 | Burrows |
| 5,966,710 A | 10/1999 | Burrows |
| 5,970,497 A | 10/1999 | Burrows |
| 5,974,412 A | 10/1999 | Hazlehurst et al. |
| 5,995,980 A | 11/1999 | Olson et al. |
| 6,005,503 A | 12/1999 | Burrows |
| 6,016,493 A | 1/2000 | Burrows |
| 6,016,501 A | 1/2000 | Martin et al. |
| 6,021,409 A | 2/2000 | Burrows |
| 6,026,388 A | 2/2000 | Liddy et al. |
| 6,026,413 A | 2/2000 | Challenger et al. |
| 6,029,165 A | 2/2000 | Gable |
| 6,035,268 A | 3/2000 | Carus et al. |
| 6,047,286 A | 4/2000 | Burrows |
| 6,067,543 A | 5/2000 | Burrows |
| 6,078,914 A | 6/2000 | Redfern |
| 6,078,916 A | 6/2000 | Culliss |
| 6,078,923 A | 6/2000 | Burrows |
| 6,088,694 A | 7/2000 | Burns et al. |
| 6,105,019 A | 8/2000 | Burrows |
| 6,119,124 A | 9/2000 | Broder et al. |
| 6,122,626 A | 9/2000 | Brandsma |
| 6,182,062 B1 | 1/2001 | Fujisawa et al. |
| 6,182,121 B1 | 1/2001 | Wlaschin |
| 6,192,258 B1 | 2/2001 | Kamada et al. |
| 6,192,333 B1 | 2/2001 | Pentheroudakis |
| 6,205,451 B1 | 3/2001 | Norcott et al. |
| 6,205,456 B1 | 3/2001 | Nakao |
| 6,216,175 B1 | 4/2001 | Sliger et al. |
| 6,233,571 B1 | 5/2001 | Egger et al. |
| 6,243,713 B1 | 6/2001 | Nelson et al. |
| 6,243,718 B1 | 6/2001 | Klein et al. |
| 6,269,361 B1 | 7/2001 | Davis et al. |
| 6,278,992 B1 | 8/2001 | Curtis et al. |
| 6,285,999 B1 | 9/2001 | Page |
| 6,295,529 B1 | 9/2001 | Corston-Oliver et al. |
| 6,308,179 B1 | 10/2001 | Petersen et al. |
| 6,324,566 B1 | 11/2001 | Himmel et al. |
| 6,336,112 B2 | 1/2002 | Chakrabarti et al. |
| 6,336,117 B1 | 1/2002 | Massarani |
| 6,336,122 B1 | 1/2002 | Lee et al. |
| 6,339,772 B1 | 1/2002 | Klein et al. |
| 6,349,308 B1 | 2/2002 | Whang et al. |
| 6,374,268 B1 | 4/2002 | Testardi |
| 6,381,602 B1 | 4/2002 | Shoroff et al. |
| 6,385,616 B1 | 5/2002 | Gardner |
| 6,418,433 B1 | 7/2002 | Chakrabarti et al. |
| 6,421,655 B1 | 7/2002 | Horvitz et al. |
| 6,457,018 B1 | 9/2002 | Rubin |
| 6,463,439 B1 | 10/2002 | Dahlberg |
| 6,507,846 B1 | 1/2003 | Consens |
| 6,519,592 B1 | 2/2003 | Getchius et al. |
| 6,519,593 B1 | 2/2003 | Matias et al. |
| 6,519,597 B1 | 2/2003 | Cheng et al. |
| 6,529,285 B2 | 3/2003 | Bobrow et al. |
| 6,542,906 B2 | 4/2003 | Korn |
| 6,547,829 B1 | 4/2003 | Meyerzon et al. |
| 6,553,385 B2 | 4/2003 | Johnson et al. |
| 6,567,804 B1 | 5/2003 | Ramasamy et al. |
| 6,578,032 B1 | 6/2003 | Chandrasekar et al. |
| 6,584,458 B1 | 6/2003 | Millett et al. |
| 6,594,682 B2 | 7/2003 | Peterson et al. |
| 6,615,209 B1 | 9/2003 | Gomes et al. |
| 6,618,725 B1 | 9/2003 | Fukuda et al. |
| 6,622,211 B2 | 9/2003 | Henry et al. |
| 6,631,369 B1 | 10/2003 | Meyerzon et al. |
| 6,631,496 B1 | 10/2003 | Li et al. |
| 6,633,872 B2 | 10/2003 | Ambrosini et al. |
| 6,643,650 B1 | 11/2003 | Slaughter et al. |
| 6,658,406 B1 | 12/2003 | Mazner et al. |
| 6,658,423 B1 | 12/2003 | Pugh et al. |
| 6,665,657 B1 | 12/2003 | Dibachi |
| 6,665,666 B1 | 12/2003 | Brown et al. |
| 6,678,409 B1 | 1/2004 | Wu et al. |
| 6,754,873 B1 | 6/2004 | Law et al. |
| 6,763,362 B2 * | 7/2004 | McKeeth ............... 707/104.1 |
| 6,766,316 B2 | 7/2004 | Caudill |
| 6,789,077 B1 | 9/2004 | Slaughter et al. |
| 6,810,375 B1 | 10/2004 | Ejerhed |
| 6,829,606 B2 | 12/2004 | Ripley |
| 6,839,665 B1 | 1/2005 | Meyers |
| 6,839,702 B1 | 1/2005 | Patel et al. |
| 6,839,843 B1 | 1/2005 | Bacha et al. |
| 6,842,730 B1 | 1/2005 | Ejerhed et al. |
| 6,845,009 B1 | 1/2005 | Whitted |
| 6,850,979 B1 | 2/2005 | Saulpaugh et al. |
| 6,865,575 B1 | 3/2005 | Smith et al. |
| 6,868,447 B1 | 3/2005 | Slaughter et al. |
| 6,870,095 B1 | 3/2005 | Whitted |
| 6,877,136 B2 | 4/2005 | Bess et al. |
| 6,904,454 B2 | 6/2005 | Stickler |
| 6,906,920 B1 | 6/2005 | Whitted |
| 6,934,634 B1 | 8/2005 | Ge |
| 7,031,954 B1 | 4/2006 | Kirsch |
| 7,051,023 B2 | 5/2006 | Kapur et al. |
| 7,243,301 B2 | 7/2007 | Bargeron et al. |
| 7,318,075 B2 | 1/2008 | Ashwin et al. |
| 7,424,467 B2 | 9/2008 | Fontoura et al. |
| 7,693,824 B1 | 4/2010 | Diament |
| 2001/0027451 A1 | 10/2001 | Taguchi et al. |
| 2001/0049671 A1 | 12/2001 | Joerg |
| 2002/0006112 A1 | 1/2002 | Jaber et al. |
| 2002/0032677 A1 | 3/2002 | Morgenthaler et al. |
| 2002/0032705 A1 | 3/2002 | Higashiyama et al. |
| 2002/0065957 A1 | 5/2002 | Rubin |
| 2002/0099723 A1 | 7/2002 | Garcia-Chiesa |
| 2002/0120685 A1 | 8/2002 | Srivastava et al. |
| 2002/0129014 A1 | 9/2002 | Kim et al. |
| 2002/0129015 A1 | 9/2002 | Caudill et al. |
| 2002/0165707 A1 | 11/2002 | Call |
| 2002/0169770 A1 | 11/2002 | Kim et al. |
| 2002/0174149 A1 | 11/2002 | Conroy et al. |
| 2002/0188615 A1 | 12/2002 | Latarche et al. |
| 2003/0028564 A1 | 2/2003 | Sanfilippo |
| 2003/0046311 A1 | 3/2003 | Baidya et al. |
| 2003/0055626 A1 | 3/2003 | Miyahira et al. |
| 2003/0093409 A1 | 5/2003 | Weil et al. |
| 2003/0163454 A1 | 8/2003 | Jacobsen et al. |
| 2003/0177127 A1 | 9/2003 | Goodwin et al. |
| 2003/0187833 A1 | 10/2003 | Plu |
| 2003/0217052 A1 | 11/2003 | Rubenczyk et al. |
| 2003/0225763 A1 | 12/2003 | Guilak et al. |
| 2003/0225779 A1 | 12/2003 | Matsuda |
| 2003/0229604 A1 | 12/2003 | Zaragoza et al. |

| | | | |
|---|---|---|---|
| 2004/0044962 | A1 | 3/2004 | Green et al. |
| 2004/0078356 | A1 | 4/2004 | Mazner et al. |
| 2004/0078387 | A1 | 4/2004 | Benjamin et al. |
| 2004/0078753 | A1* | 4/2004 | Doyle ........................ 715/501.1 |
| 2004/0098399 | A1 | 5/2004 | Risberg et al. |
| 2004/0111408 | A1 | 6/2004 | Caudill et al. |
| 2004/0123104 | A1 | 6/2004 | Boyen et al. |
| 2004/0128615 | A1 | 7/2004 | Carmel et al. |
| 2004/0162997 | A1 | 8/2004 | Hopmann et al. |
| 2004/0215606 | A1 | 10/2004 | Cossock |
| 2004/0230598 | A1 | 11/2004 | Robertson et al. |
| 2004/0243554 | A1 | 12/2004 | Broder et al. |
| 2004/0243556 | A1 | 12/2004 | Ferrucci et al. |
| 2004/0243557 | A1 | 12/2004 | Broder et al. |
| 2004/0243560 | A1 | 12/2004 | Broder et al. |
| 2004/0243581 | A1 | 12/2004 | Weissman et al. |
| 2004/0243645 | A1 | 12/2004 | Broder et al. |
| 2005/0033745 | A1 | 2/2005 | Wiener et al. |
| 2005/0044411 | A1 | 2/2005 | Somin et al. |
| 2005/0120004 | A1 | 6/2005 | Stata et al. |
| 2005/0144241 | A1 | 6/2005 | Stata et al. |
| 2005/0149499 | A1 | 7/2005 | Franz et al. |
| 2005/0149576 | A1 | 7/2005 | Marmaros et al. |
| 2005/0149851 | A1 | 7/2005 | Mittal |
| 2005/0198076 | A1 | 9/2005 | Stata et al. |
| 2006/0047825 | A1 | 3/2006 | Steenstra et al. |
| 2006/0074962 | A1 | 4/2006 | Fontoura et al. |
| 2007/0198456 | A1 | 8/2007 | Betz et al. |
| 2007/0271268 | A1 | 11/2007 | Fontoura et al. |
| 2007/0282829 | A1 | 12/2007 | Fontoura et al. |
| 2008/0294634 | A1 | 11/2008 | Fontoura et al. |
| 2008/0301130 | A1 | 12/2008 | Fontoura et al. |
| 2009/0083270 | A1 | 3/2009 | Kraft et al. |

FOREIGN PATENT DOCUMENTS

| | | |
|---|---|---|
| EP | 0809197 A2 | 11/1997 |
| JP | 9311870 A | 12/1997 |
| JP | 10289246 | 10/1998 |
| JP | 10293767 | 11/1998 |
| JP | 2000339309 | 12/2000 |
| JP | 2002163276 | 6/2002 |
| WO | 9749048 | 12/1997 |

OTHER PUBLICATIONS

Miscellaneous Articles from Newsgroups, Available from: (1) Newsgroups:google.public.support.general; Date: Jul. 5, 2002 and Jul. 6, 2002; (2) Newsgroups: comp.protocols.tcp-ip.domains; Date Apr. 8, 2000; (3) Newsgroups: micorsoft.public.frontpage.client; Date: Mar. 18, 1999 [3 entries] and Mar. 19, 1999 and (4) Newsgroups:alt.internet.search-engines; Date: Jan. 26, 2002.

Kaindl. H., et al., "*Combining Structure Search and Content Search for the World-Wide Web,*"1998 ACM, ISBN 0-89791-972-6—Jun. 1998, pp. 217-224.

Weinreich, H., et al., "*The Look of the Link—Concepts for the User Inerface of Extended Hyperlinks*," 2001, ACM ISBN 1-59113-420—Jul. 1, 2001, pp. 19-28.

Dieberger, A. "*Context Lenses—Document Visualization and Navigation Tools for Rapid Access to Detail.*" In Human-Computer Interaction INTERACT '01. IFIP TC. 13 International Conference on Human-Computer Interaction, Jul. 9-13, 2001, Tokyo, Japan, IOS Press. Title page, copyright page and article (pp. 545-552).

Hardman, L. "*Links in Hypermedia: the Requirement for Context.*" 5th ACM Conference on Hypertext, '93 Proceedings, pp. 183-191.

Baeza-Yates, R. and B. Ribeiro-Neto, "*Modern Information Retrieval..*" England: Pearson Education Limited, 1999, title page, copyright page, table of contents (ix-xvi), and Chapter 8 "Indexing and Searching" (pp. 191-199, 222-228, 382-384).

Lipyeow, L. et al. "*Dynamic Maintenance of Web Indexes Using Landmarks,*" 10 pages. WWW2003, May 20-24, 2003, Budapest, Hungary, ACM. Available from http://citreseer.nj.ncc.com/590376.html.

Zobel, J. et al. "*In-Memory Hash Tables for Accumulating Text Vocabularies,*" pp. 1-9. Information Processing Letters, vol. 80, No. 6, pp. 271-277, 2001. Available from http://citeseer.nj.nec.com/ 529586.html.

Brown, E. et al. "*Execution Performance Issues in Full-Text Information Retrieval.*" Technical Report 95-81, Oct. 1995. Computer Science Department, Amherst, MA (Ph.D. Thesis), 179 pages. Available from http://citeseer.nj.nec.com/brown95execution.html.

Brown, E. et al. "*Fast Incremental Indexing for Full-Text Information Retrieval,*" pp. 1-11. Proceedings of the 20th VLDB Conference, pp. 192-202, Santiago, Chile, 1994. Available from http://citeseer.nj.nec.com/brown94fast.html.

Lu, Z. "*Scalable Distributed Architectures for Information Retrieval.*" Amherst, MA (Ph.D. Thesis), 178 pages. Available from http://citeseer.nj.nec.com/luscalable.html.

Agarwal, R.C. "*A Super Scalar Sort Algorithm for RISC Processors,*" pp. 240-246. Proceedings of the 1996 ACM SIGMOD International Conference on Management of Data, 1996. Available from http://citeseer.nj.nec.com/agarwal96super.html.

Arpaci-Dusseau, A.C. et al. "*High Performance Sorting on Networks of Workstations,*" 12 pages. Proceedings of the 1996 ACM SIGMOD International Conference on Management of Data, 1997. Available from http://portal.acm.org/citation.cfm?id=253322&coll=portal &dl=ACM&CFID=13536765&CFTOKEN=64334274.

Clarke, C.L.A., et al. "*Shortest Substring Ranking (MultiText Experiments for TREC-4),*" pp. 1-10. Proceedings of the Fourth Text Retrieval Conference, Nov. 1995. Available from http://citeseer.nj.nec.com/84012.html.

Tomasic, A. et al. "*Performance of Inverted Indices in Shared-Nothing Distributed Text Document Information Retrieval Systems,*" 11 pages. Proceedings of the 2nd International Conference on Parallel and Distributed Information Systems, Jan. 1983url=.

Tomasic, et al. "*Incremental Updates of Inverted Lists for Text Document Retrieval,*" pp. 143, Available from http://citeseer.nj.nec.com/ tomasic93incremental.html.

Melnik, S. et al. "*Building a Distributed Full-Text Index for the Web,*" 10 pages, 2001. In *World Wide Web*, pp. 396-406. Available from http://citeseer.nj.nec.com/long03optimized.html.

Long, X and T. Suel, "*Optimized Query Execution in Large Search Engines with Global Page Ordering,*" 12 pages. Proceedings of the 29th VLDB Conference, Berlin, Germany, 2003. Available from http://citeseer.nj.nec.com/long03optimized.html.

Callan, J.P et al. "*The INQUERY Retrieval System,*" 9 pages. Proceedings {DEXA}-92, 3rd International Conference on Database and Expert Applications, pp. 78-83, 1992. Available from http://citeseer. nj.nec.com/26307.html.

Pearson, P.K. "*Fast Hashing of Variable Length Text Strings,*" pp. 677-680. Communications of the ACM, Jun. 1990, vol. 33, No. 6.

Witten, I.H., et al. "*Managing Gigabytes. Compressing and Indexing Documents and Images.*" San Francisco: Morgan Kaufmann Publishers, 1999, title page, copyright page, table of contents (v-xi) and Chapter 5 "Index Construction" (pp. 223-261).

Corme, T.H., et al. "*Introduction to Algorithms.*" Cambridge: The MIT Press, Second Edition, 2003, title page, copyright page, table of contents (v-xi) and Chapter 8 "Sorting in Linear Time" (pp. 165-177).

Sedgewick, R. "*Algorithms in C++. Parts 1-4.*" Boston: Addison-Wesley Publishing Co., 1998. title page, copyright page, table of contents (xv-xix) and Chapter 10 "Radix Sorting" (pp. 417-433, 436-450).

U.S. Appl. No. 10/764,801, filed Jan. 26, 2004, entitled *Method, System, and Program for Handling Anchor Text*, by R. Kraft, et al.

U.S. Appl. No. 10/764,800, filed Jan. 26, 2004, entitled *Architecture for an Indexer*, by M. F. Foutoura, et al.

U.S. Appl. No. 10/764,772, filed Jan. 26, 2004, entitled *A Pipelined Architecture for Global Analysis and Index Building*, by M. F. Foutoura, et al.

Agrawal, S., S. Chaudhuri and G. Das, "DBXplorer: A System for Keyword-Based over Relational Databases," Proceedings of 18th International Conference on Data Engineering, 2002, 12 pp.

Agrawal, S., S Chaudhuri and G. Das, "DBXplorer: Enabling Keyword Search Over Relational Databases", Proceedings of the 2002 ACM SIGMOD International Conference on Management of Data, 2002, p. 627.

Bhalotia, G., A. Hulgeri, C Nakhe, S. Chakrabarti and S. Sudarshan, "Keyword Searching and Browsing in Databases Using BANKS", Proceedings of the 18th International Conference on Data Engineering, 2002, 10 pp.

Brin, S. and L. Page, "The Anatomy of a Large-Scale Hypertextual Web Search Engine", Computer Networks and ISDN Systems, vol. 30, No. 1-7, 1998, pp. 107-117.

Broder, A.Z., D. Carmel, M. Herscovichi, A. Soffer and J. Zien, "Efficient Query Evaluation Using a Two-Level Retrieval Process", Twelfth International Conference on Information Knowledge Management (CIKM 2003), 2003, pp. 426-434.

Broder, A.Z., S.C. Glassman, M.S. Manasse, and G. Zweig, "Syntactic Clustering of the Web", Computer Networks and ISDN Systems, vol. 29, Iss. 8-13, 1997, pp. 1157-1166.

Bruno, N., K. Koudas and D. Srivastava, "Holistic Twig Joins: Optimal XML Pattern Matching", Proceedings of the 2002 ACM SIGMOD International Conference on Management of Data, 2002, pp. 310-321.

Carmel, D., Y. Maarek, M. Mandelbrod, Y. Mass and A Soffer, "Searching XML Documents via XML Fragments," Proceedings of the 26th Annual International ACM SIGIR Conference on Research and Development in Information Retrieval, 2003, pp. 151-158.

Fontoura, M., E. Shekita, J. Zien, S. Rajagopalan and A. Neumann, "High Performance Index Build Algorithms for Intranet Search Engines", Proceedings of 30th International Conference on Very Large Data Bases, 2004, pp. 1158-1169.

French, G., "Hacking the Google Numrange Operator", [online], Apr. 1, 2004, [retrieved on Aug. 31, 2004], retrieved from the Internet at <URL: http://www.webpronews.com/insiderreports/searchinsider/wpn-49-20040401HackingtheGoogleNumrangeOperator.html>.

Google, "Advanced Search", [online], 2003, [retrieved on Aug. 31, 2004], retrieved from the Internet at <URL: http://www.google.com/help/refinesearch.html>.

Gravano, L., P.G. Ipeirotis, N. Koudas and D. Srivastava, "Text Joins in an RDBMS for Web Data Integration", Proceedings of the 12th International Conference on World Wide Web, 2003, pp. 90-101.

Guttman, A., "R-Trees: A Dynamic Index Structure for Spatial Searching", Proceedings of the 1984 ACM SIGMOD International Conference on Management of Data, 1984, pp. 47-57.

Hristidis, V. and Y. Papakonstantinou, "Discover: Keyword Search in Relational Databases", Proceedings of the 28th VLDB Conference, 2002, 12 pp.

Kaushik, R., R. Krishnamurthy, J.F. Naughton and R. Ramakrishnan, "On the Integration of Structure Indexes and Inverted Lists," Proceedings of the 20th International Conference on Data Engineering, 2004, 1 pg.

Melnik, S., S. Raghavan, B. Yang and H. Garcia-Molina, "Building a Distributed Full-Text Index for the Web," ACM Transactions on Information Systems, vol. 19, No. 3, Jul. 2001, pp. 217-241.

Press, W.H., B.P. Flannery, S.A. Teukolsky and W.T. Vetterling, "Numerical Recipes in C: The Art of Scientific Computing", 1998, Ch. 9, pp. 258-263.

Raghavan, S. and H. Garcia-Molina, "Complex Queries over Web Repositories", Proceedings of the 29th VLDB Conference, 2003, pp. 33-44.

Raghavan, S. and H. Garcia-Molina, "Integrating Diverse Information Management Systems: A Brief Survey", IEEE Data Engineering Bulletin, 2001, vol. 24, No. 4, pp. 44-52.

Ramsak, F., V. Markl, R. Fenk, M. Zirkel, K. Elhardt and R. Bayer, "Integrating the UB-Tree into a Database System Kernel", Proceedings of 26th International Conference on Very Large Data Bases, Sep. 2000, pp. 263-272.

Spertus, E. and L.A. Stein, "Squeal: A Structured Query Language for the Web", Proceedings of the 9th international World Wide Web Conference on Computer Networks, 2000, pp. 95-103.

U.S. Appl. No. 11/182,334, filed Jul. 14, 2005, entitled "Enforcing Native Access Control to Indexed Documents", invented by R. Lempel, T. Leyba, J.A. McPherson, JR., and J.L. Perez.

U.S. Appl. No. 11/295,397, filed Dec. 5, 2005, entitled "Improving Text Search Quality by Exploiting Organizational Information", invented by T. Hampp, M. Baessler, A. Lang, T.W. Goetz, A. Baader, and J. Doerre.

Lomet, D. (Ed.), "Bulletin of the Technical Committee on Data Engineering", Dec. 2001, vol. 24, No. 4, 56 pp.

Lu, W, L. Chien, & H. Lee, "Anchor Text Mining for Translation of Web Queries", Proceedings from the International Conference on Data Mining, Nov. 2001, pp. 401-408.

PCT International Search Report and Written Opinion, May 6, 2005, for International Application No. PCT/EP2005/050321.

PCT International Search Report and Written Opinion, Oct. 30, 2006, for International Application No. PCT/EP2006/064281.

Brin, S. and L. Page, "The Anatomy of a Large-Scale Hypertextual Web Search Engine", Computer Networks and ISDN Systems, vol. 30, No. 1-7, 1998, Total 20 pp.

Broder, A.Z., S.C. Glassman, M.S. Manasse, and G. Zweig, "Syntactic Clustering of the Web", [online], [Retrieved on Jul. 21, 2005]. Retrieved from the Internet at <URL: http://www.ra.ethz.ch/CDstore/www6/Technical/Paper205/Paper205.html>, Total 13 pp.

Brown, E., "Execution Performance Issues in Full-Text Information Retrieval", Technical Report 95-81, Oct. 1995, Total 197 pp.

Callan, J.P., W.B. Croft, and S.M. Harding, "The Inquery Retrieval System", Proceedings of the 3rd International Conference on Database and Expert Systems Applications, 1992, Total 9 pp.

EP Office Action, Dec. 28, 2007, for European Application No. 05 701 609.9-2201, Total 6 pp.

Lee, J., S.J. Upadhyaya, H.R. Rao, and R. Sharman, "Secure Knowledge Management and the Semantic Web", Communications of the ACM, vol. 48, No. 12, Dec. 2005, Total 7 pp.

Office Action 1, Jun. 16, 2009, for EP Application No. EP06777790.4-1245, Total 3 pp.

Office Action 1 & Translation, Jul. 31, 2009, for Application No. CN2006800253422, Total 8 pp.

Patent Abstract for JP10289246, published Oct. 27, 1998, Total 1 p.

Press, W.H., B.P. Flannery, S.A. Teukolsky and W.T. Vetterling, "Numerical Recipes in C: The Art of Scientific Computing", 1998, Ch. 9, Total 8 pp.

Spertus, E. and L.A. Stein, "Squeal: A Structured Query Language for the Web", Proceedings of the 9th International World Wide Web Conference on Computer Networks, 2000, [online], [Retrieved on Sep. 4, 2002]. Retrieved from the Internet at <URL: http://www9.org/w9cdrom/222/222.html>, Total 12 pp.

Zobel, J., S. Heinz, and H.E. Williams, "In-Memory Hash Tables for Accumulating Text Vocabularies", Information Processing Letters, vol. 80, Iss. 6, 2001, Total 9 pp.

Abstract and Machine Translation for JP2002163276, published on Jun. 7, 2002, 31 pp.

English Abstract for JP9311870, published on Dec. 2, 1997, 1 p [has English counterparts EP0809197 & US5848407 discussed in Remarks submitted with this IDS].

Susaki, S. and T. Muramoto, "A New Decision Factor for IR System Extracted from Structure of Hypertexts" Jul. 16, 1999, English abstract begins on line 17, Total 9 pp.

IDS Report, Aug. 27, 2010, from the Aug. 10, 2010 Office Action for SVL920030117JP1, Total 3 pp.

Silvestri, F., S. Orlando, and R. Perego, "Assigning Identifiers to Documents to Enhance the Clustering Property of Fulltext Indexes", ACM 2004, Total 8 pp.

Silvestri, F., "High Performance Issues in Web Search Engines: Algorithms and Techniques", May 2004, Total 111 pp.

Shen, W., T. Chen, and C. Chung, "A Tree-based Inverted File for Fast Ranked-Document Retrieval", Proeedings of the International Conference on Information and Knowledge Engineering, © 2003, Total 6 pp.

EP Response, Apr. 23, 2012, for EP Application No. 06777790.4-1243, Total 8 pp.

* cited by examiner

METHOD, SYSTEM, AND PROGRAM FOR HANDLING REDIRECTS IN A SEARCH ENGINE

BACKGROUND OF THE INVENTION

1. Field of the Invention

The present invention is related to handling redirects in a search engine.

2. Description of the Related Art

The World Wide Web (also known as WWW or the "Web") is a collection of some Internet servers that support Web pages that may include links to other Web pages. A Uniform Resource Locator (URL) indicates a location of a Web page. Also, each Web page may contain, for example, text, graphics, audio, and/or video content. For example, a first Web page may contain a link to a second Web page.

A Web browser is a software application that is used to locate and display Web pages. Currently, there are billions of Web pages on the Web.

Web search engines are used to retrieve Web pages on the Web based on some criteria (e.g., entered via the Web browser). That is, Web search engines are designed to return relevant Web pages given a keyword query. For example, the query "HR" issued against a company intranet search engine is expected to return relevant pages in the intranet that are related to Human Resources (HR). The Web search engine uses indexing techniques that relate search terms (e.g., keywords) to Web pages.

Some Web pages do not contain content, but, instead, contain a "redirect" to another Web page. For example, if a given Web page A (i.e., a source) redirects to another Web page B (i.e., a target), the Web browser shows Web page B whenever a request for Web page A is received. There are several ways of implementing redirects, including Hyper Text Transfer Protocol (HTTP) redirects (e.g., with HTTP return codes 301 and 302), the use of a META REFRESH tag in Hyper Text Markup Language (HTML), and scripting languages such as JavaScript.

Redirects are a challenge to Web search engines since the content of a target page should be used to index a source page. For instance, if Web page A redirects to Web page B, then the URL of Web page A should be indexed with the content of Web page B because Web page A has no content, just the redirect (e.g. the JavaScript code that does the redirect). Moreover, redirects may form chains (e.g., Web page A redirects to Web page B, which in turn redirects to Web page C), in which case the transitive closure relationship should be resolved. Additionally, redirect chains may have cycles (e.g., Web page A redirects to Web page B, which redirects to Web page C, which redirects to Web page A), in which case these Web pages should not be indexed because the Web browser cannot display them. Conventional search engines do not handle redirects well. Additionally, conventional search engines handle redirects when "crawling" (i.e., retrieving Web pages), and so they lose the ability to use redirect information in conjunction with, for example, ranking, duplicate detection, and anchor text processing.

Thus, there is a need for improved redirect processing.

SUMMARY OF THE INVENTION

Provided are a method, system, and program for handling redirects in documents. At least one equivalence class that includes documents that are connected through a redirect. Cycles for each equivalence class are detected, wherein documents in a cycle are marked so that they are not indexed. Incomplete chains for each equivalence class are detected, wherein documents in an incomplete chain are marked so that they are not indexed. A representative for each equivalence class is selected.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Figure 1:
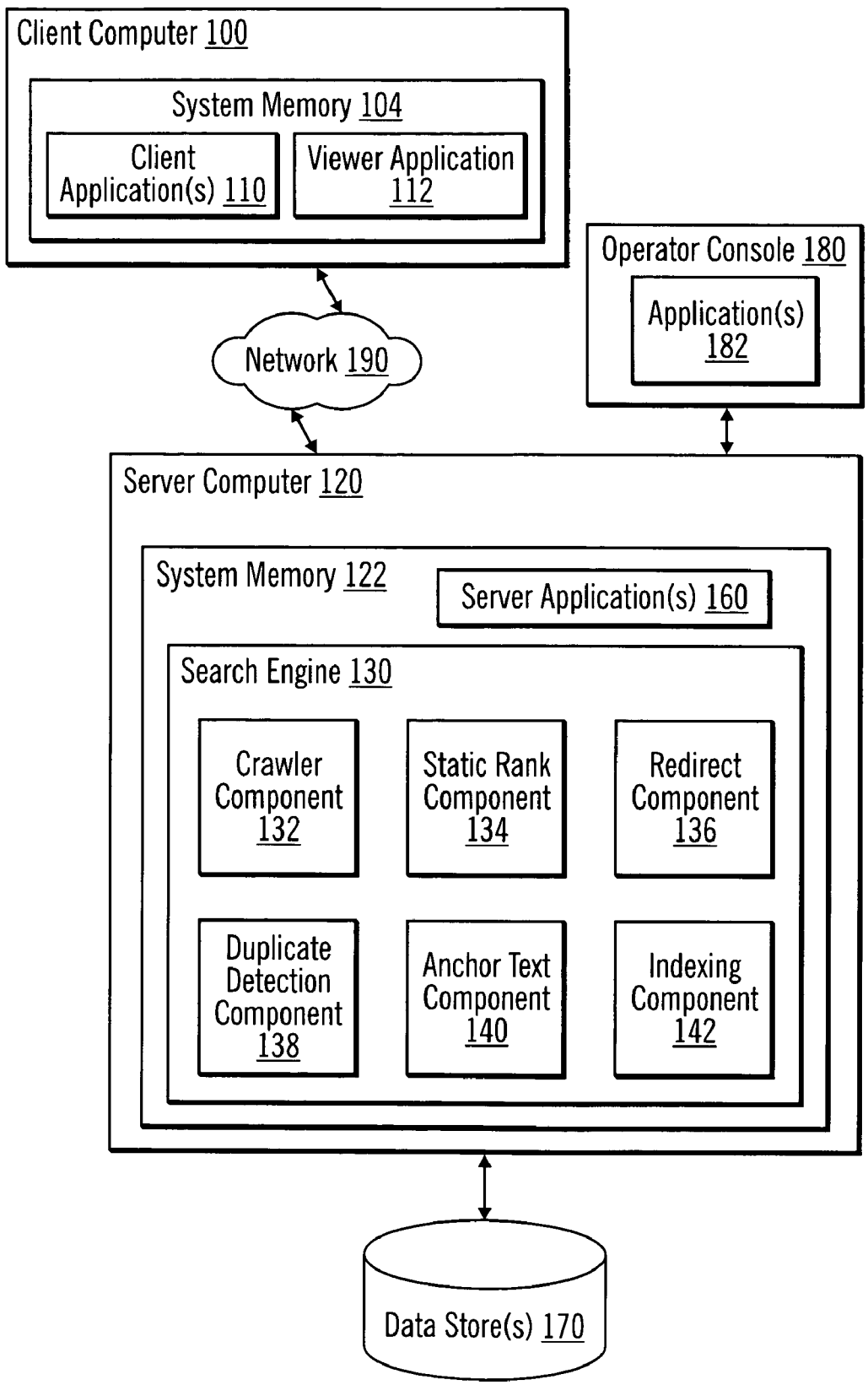
FIG. 1 illustrates, in a block diagram, a computing environment in accordance with certain implementations of the invention.

FIG. 1 illustrates, in a block diagram, a computing environment in accordance with certain implementations of the invention. A client computer 100 is connected via a network 190 to a server computer 120. The client computer 100 may comprise any computing device known in the art, such as a server, mainframe, workstation, personal computer, hand held computer, laptop telephony device, network appliance, etc. The network 190 may comprise any type of network, such as, for example, a Storage Area Network (SAN), a Local Area Network (LAN), Wide Area Network (WAN), the Internet, an Intranet, etc. The client computer 100 includes system memory 104, which may be implemented in volatile and/or non-volatile devices. One or more client applications 110 and a viewer application 112 may execute in the system memory 104. The viewer application 112 provides an interface that enables searching of a set of documents (e.g., stored in one or more data stores 170. In certain implementations, the viewer application 112 is a Web browser.

The server computer 120 includes system memory 122, which may be implemented in volatile and/or non-volatile devices. A search engine 130 executes in the system memory 122. In certain implementations, the search engine includes a crawler component 132, a static rank component 134, a redirect component 136, a duplicate detection component 138, an anchor text component 140, and an indexing component 142. Although components 132, 134, 136, 138, 140, and 142 are illustrated as separate components, the functionality of components 132, 134, 136, 138, 140, and 142 may be implemented in fewer or more or different components than illustrated. Additionally, the functionality of the components 132, 134, 136, 138, 140, and 142 may be implemented at a Web application server computer or other server computer that is connected to the server computer 120. Additionally, one or more server applications 160 execute in system memory 122.

The server computer 120 provides the client computer 100 with access to data in at least one data store 170 (e.g., a database). Although a single data store 170 is illustrated, for ease of understanding, data in data store 170 may be stored in data stores at other computers connected to server computer 120.

Also, an operator console 180 executes one or more applications 182 and is used to access the server computer 120 and the data store 170.

The data store 170 may comprise an array of storage devices, such as Direct Access Storage Devices (DASDs), Just a Bunch of Disks (JBOD), Redundant Array of Independent Disks (RAID), virtualization device, etc. The data store 170 includes data that is used with certain implementations of the invention.

Figure 2A:
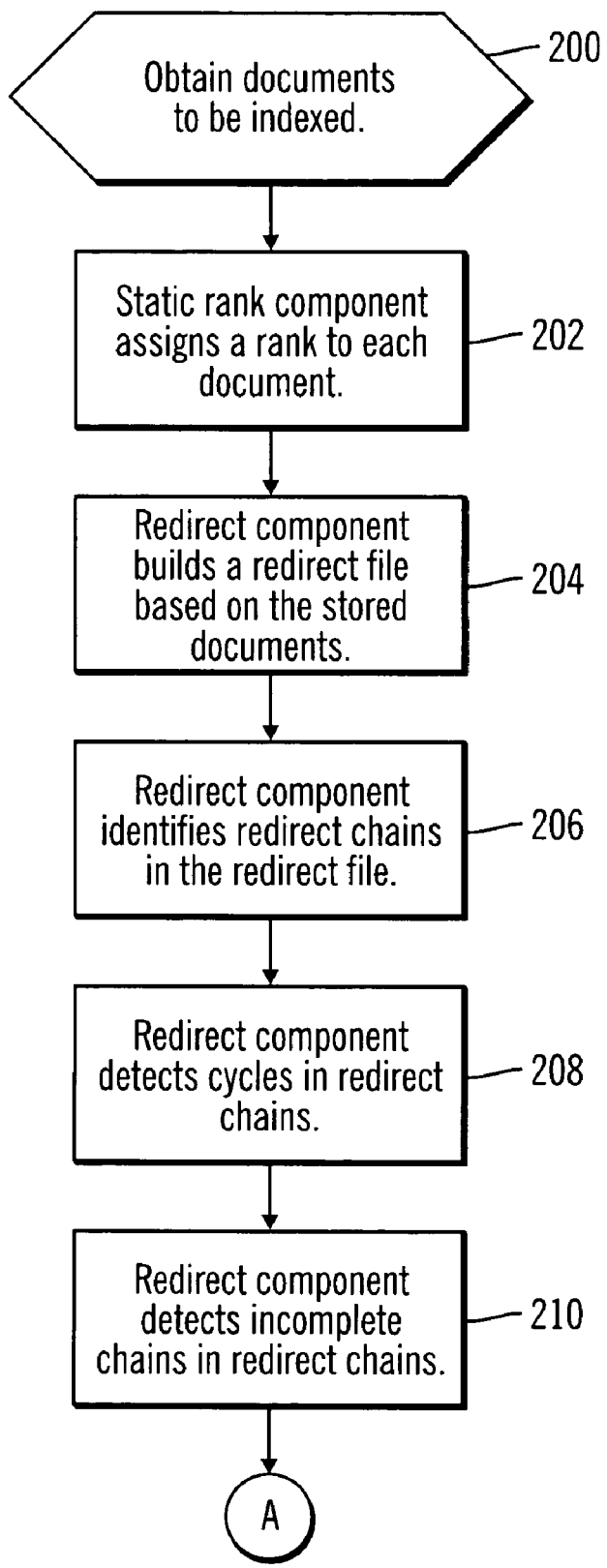
FIGS. 2A and 2B illustrate logic implemented to generate an index in accordance with certain implementations of the invention.
Figure 2B:
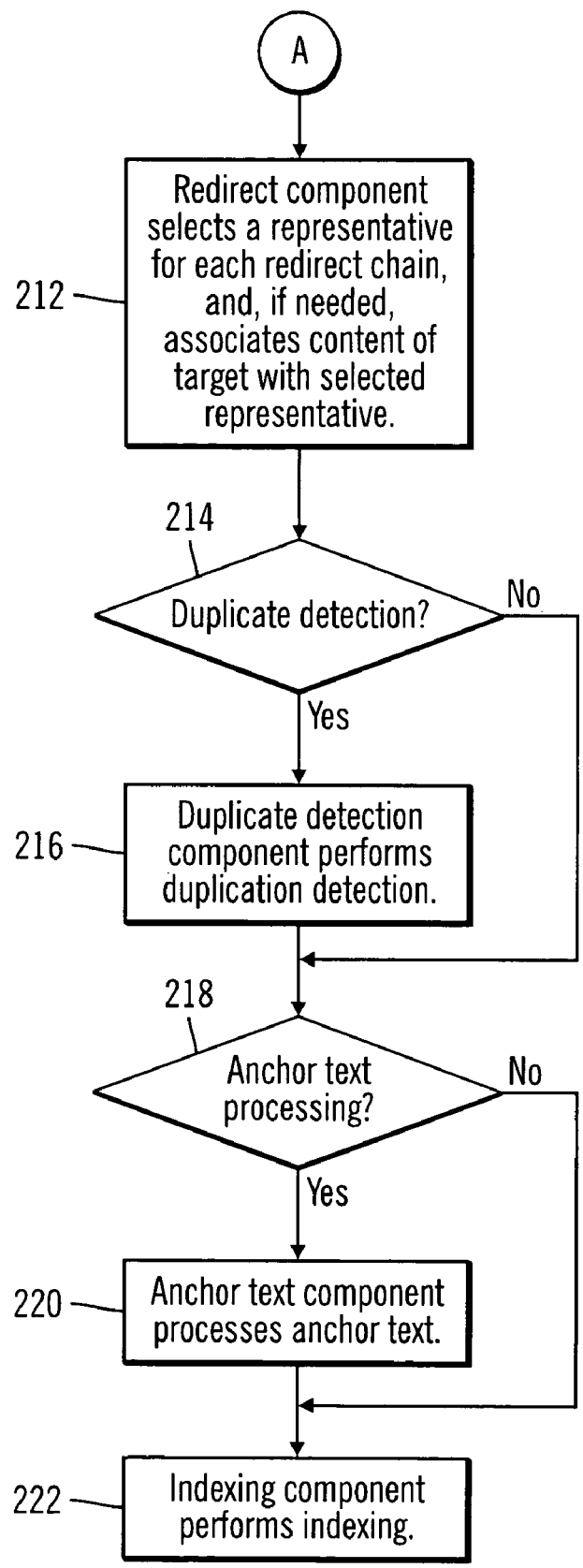

FIGS. 2A and 2B illustrate logic implemented to generate an index in accordance with certain implementations of the invention. Control begins at block 200 documents that are to be indexed by the search engine 130 are obtained. In certain implementations, the documents are published or pushed (e.g., as may be the case with newspaper articles) to the indexing component 142. In certain implementations, the crawler component 132 discovers, fetches, and stores the documents. In certain implementations, the crawler component 132 may discover documents based on, for example, certain criteria (e.g., documents were accessed within the last month). Additionally, the crawler component 132 may discover documents in one or more data stores connected directly (e.g., data store 170) or indirectly (e.g., connected to server computer 120 via another computing device (not shown)) to server computer 120. In certain implementations, the crawler component 132 discovers, fetches, and stores Web pages in data store 170. In certain implementations, the crawler component 132 may associate an indicator with a document if the document contains a redirect.

In block 202, the static rank component 134 reviews the stored documents and assigns a rank to the documents. The rank may be described as the importance of the source document relative to other documents that have been stored by the crawler component 132. Any type of ranking technique may be used. For example, documents that are accessed more frequently may receive a higher rank.

In block 204, the redirect component 136 builds a redirect file based on the stored documents. In certain implementations, the redirect component 136 performs a data store scan to read the documents stored by the crawler component 132 and determines whether the document contains a redirect. In certain implementations, the redirect component 136 determines whether a document contains a redirect based on metadata associated with each document, markup data associated with each document, or content of each document. For instance, the redirect component may detect an HTTP return code (e.g., codes 301 or 302 in a HTTP header) indicating a redirect in the document, a META REFRESH directive in a HTML document, or a script (e.g., JavaScript) that performs a redirect in the document.

If the document contains a redirect, the redirect component 136 determines a target document of the redirect. In the case that a document contains a redirect, the redirect component 136 stores an entry for the document in the redirect file. In certain implementations, an entry consists of a source path (e.g., URL), a target path (e.g., URL), and a redirect type. A path may be described as data that indicates a location of a document.

Although examples herein may refer to HTML format or HTTP meta data, certain implementations of the invention are applicable to other formats and other retrieval protocols (e.g., different formats such as XML or Portable Document Format (PDF) and different retrieval protocols such as symbolic links in file systems, the File Transfer Protocol (FTP), etc.).

In block 206, the redirect component 136 identifies redirect chains in the redirect file. One example of a redirect chain occurs when a first document redirects to a second document, which in turn redirects to a third document. In certain implementations, the redirect component 136 identifies the redirect chains by scanning the redirect file and building a "union find" data structure to identify the redirect chains. The "union find" data structure could, for instance, be a mapping from documents to equivalence classes. An equivalence class may be described as including documents that are connected through a redirect. For example, if a source document has a redirect to a target document, the source document and target document are mapped to the same equivalence class.

Initially, each document is in its own equivalence class. Then, for each entry in the redirect file, if a first document redirects to a second document, the equivalence classes of the first and second documents are unified. Continuing with this processing, if the second document redirects to a third document, then the third document is in the same equivalence class as the first and second documents. The redirect component 136, thus, processes the entries in the redirect file to identify redirect chains in the form of equivalence classes.

In block 208, the redirect component 136 detects cycles in the redirect chains. For example, a cycle occurs when a first document redirects to a second document, which redirects to a third document, which redirects back to the first document. Once the redirect chains are identified, the redirect component 136 performs cycle detection. In particular, cycle detection analyzes each redirect chain, looking for cycles. If a cycle is detected in a redirect chain, the redirect component 136 marks the documents involved in that redirect chain with a "do not index" indicator (e.g., flag), which indicates to the indexing component 142 that these documents are invalid documents that should not be indexed.

In block 210, the redirect component 136 detects incomplete chains in the redirect chains. In certain implementations, the incomplete chain detection is performed for chains that are not marked with a "do no index" indicator. An example of an incomplete chain occurs when the documents in a single redirect chain are redirects, R1->R2-> . . . ->Rn, where Rn is a redirect to a document that was not discovered, fetched, and stored by the crawler component 132 (i.e., "crawled"). This redirect chain is considered incomplete because there is no content associated with Rn (because it was not "crawled"). The redirect component 136 marks documents in the incomplete redirect chain with a "do not index" indicator.

In block 212, the redirect component 136 selects a representative for each redirect chain, and, if needed, propagates content of a target document with the selected representative. The technique for selecting a representative may be adapted to a search engine 130 policy. For instance, if a first document redirects to a second document, the content of the second document may be indexed with the path of either the first or second document. The selection may depend on the redirect type, for example, whether the redirect is permanent or temporary, or may be based on a static rank computed for each document.

In certain implementations, the redirect component 136 selects a representative for each redirect chain (e.g., equivalence class) whose documents have not been marked with a "do not index" indicator. In certain implementations, the representative is a path (e.g., a URL) with which the content of the final target document in the chain is indexed. The final target document in the redirect chain contains content, while the other documents in the redirect chain redirect to the final target document. The other documents may directly (e.g., a second document redirects to the final target document) or indirectly (e.g., a first document redirects to a second document that redirects to the final target document) redirect to the final target document.

In certain implementations, the redirect component 136 selects a representative based on the type of the redirects (e.g., permanent or temporary), a static rank assigned to each document by the static rank component 134, or based on other criteria. For instance, for HTTP permanent redirects, the redirect component 136 may select the path (e.g., URL) of the target document, while for HTTP temporary redirects, the redirect component 136 may select the path (e.g., URL) of a source document. If selection is based on a ranking, a document with a highest ranking in an equivalence class may be selected. In certain embodiments, the paths for documents that are not selected are marked with an "ignore" indicator so that these paths are not included in an index.

Moreover, the content of the target document may be propagated to the selected representative. For example, if the selected representative includes a temporary redirect, the content of the target document is propagated to the selected representative.

In block 214, the search engine 130 determines whether duplicate detection is to be performed. If so, processing continues to block 216, otherwise, processing continues to block 218. In block 216, the duplicate detection component 138 detects duplicate documents in different redirect chains and merges the redirect chains. In certain implementations, the duplicate detection component 138 uses a content-based duplicate detection technique that uses information about the documents in the redirect chain (i.e., the equivalence class) in the "union find" data structure. In certain embodiments, two documents may be considered to be duplicates if they are similar (e.g., more than some percentage (e.g., 90%) of their content is the same). For example, if a first and second document are considered equivalent by content, and if a third document redirects to the first document and a fourth document redirects to the second document, the redirect component 136 concludes that the first, second, third, and fourth documents are equivalent. Additionally, if a redirect chain has a first document and another redirect chain has a second document, and if the first document and second document are duplicates based on content, the redirect chains containing the first and second documents are merged to form one redirect chain.

In block 218, the search engine 130 determines whether anchor text processing is to be performed. If so, processing continues to block 220, otherwise, processing continues to block 222. In block 220, the anchor text component 140 performs anchor text processing. Anchor text may be described as text associated with a path or link (e.g., a URL) to a document. In certain implementations, anchor text is text that labels or encloses hypertext text links in Web documents.

The search engine 130 may collect, for each document, the anchor text of paths that point to that document, and then the anchor text may be indexed along with the document content. For example, if a first document links to a second document, and the second document is a redirect to a third document, then the anchor text of the path from the first document to the second document is indexed along with the content of the third document, if the document is considered the representative of the redirect chain.

In certain implementations, the anchor text component 140 uses an anchor text indexing technique that uses information about the documents in the redirect chain (i.e., the equivalence class) in the "union find" data structure to propagate anchor text to the representatives of redirect chains. As another example, if a first and a second document are in a redirect chain (e.g., an equivalence class) whose representative is a third document, then the anchor text pointing to the first document and to the second document is indexed for the third document, along with the content of the target document of the redirect.

In block 222, the indexing component 142 generates an index. In particular, for each redirect equivalence class, the indexing component 142 locates the target document that contains content (e.g., the target of the redirects) and indexes that content with the path (e.g., URL) of the representative for the redirect chain (e.g., equivalence class). The indexing component 142 performs indexing for the documents stored by the crawler component 132.

In certain implementations, paths of each document in the equivalence class may also be propagated to the selected representative for global analysis, which is described further in U.S. patent application Ser. No. 10/764,722, entitled "A PIPELINED ARCHITECTURE FOR GLOBAL ANALYSIS AND INDEX BUILDING," by Marcus F. Fontoura et al., filed on the same date herewith, and which is incorporated by reference herein in its entirety.

Figure 3:
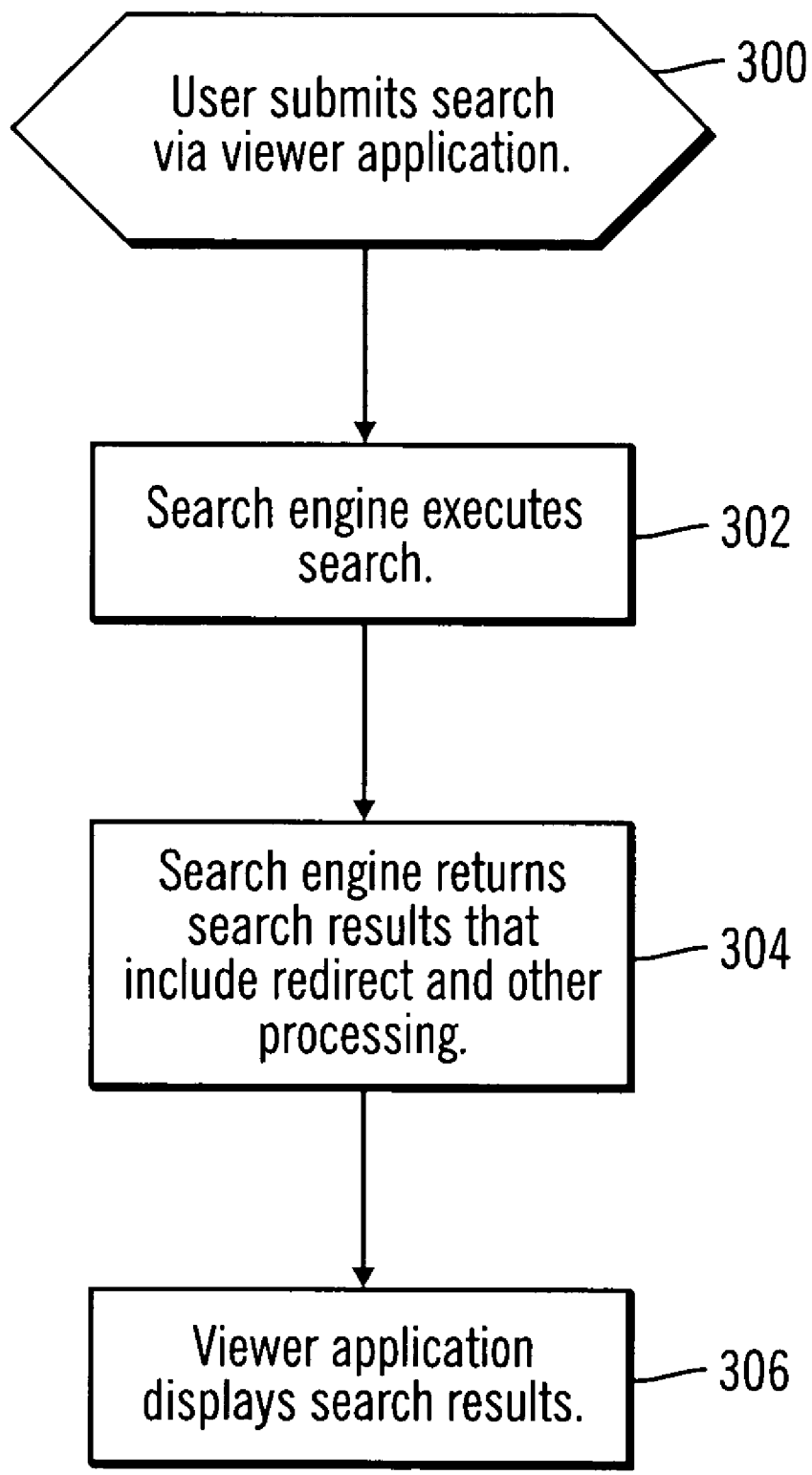
FIG. 3 illustrates logic for performing a document search in accordance with certain implementations of the invention.

FIG. 3 illustrates logic for performing a document search in accordance with certain implementations of the invention. Control begins at block 300 with a user submitting a search request via the viewer application 112. In block 302, the search engine 130 executes the search request. In block 304, the search engine returns search results that include the redirect and other processing described in FIGS. 2A and 2B. In block 306, the viewer application 112 displays the search results.

Thus, certain implementations of the invention address the problem of indexing redirects in a search engine 130. Certain implementations of the invention identify redirects and group documents into equivalence classes. Certain implementations of the invention also identify cycles in redirect chains and incomplete redirect chains and avoid indexing the documents in a cyclic or incomplete redirect chains (i.e,. the documents marked "do not index" are not included in the index generated by the indexing component 142). Also, for each redirect chain, certain implementations of the invention identify a path for which the content is to be indexed, and marks all other paths to be ignored. Certain implementations of the invention work in conjunction with a content-based duplicate detection technique and with an anchor text indexing technique. The result of the processing of certain implementations of the invention is an improved index. Thus, the quality of results delivered by the search engine to its users is improved.

Additional Implementation Details

The described techniques for handling redirects in a search engine may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which various implementations are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 2A, 2B, and 3 describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 2A, 2B, and 3 may be implemented in software, hardware, programmable and non-programmable gate array logic or in some combination of hardware, software, or gate array logic.

Figure 4:
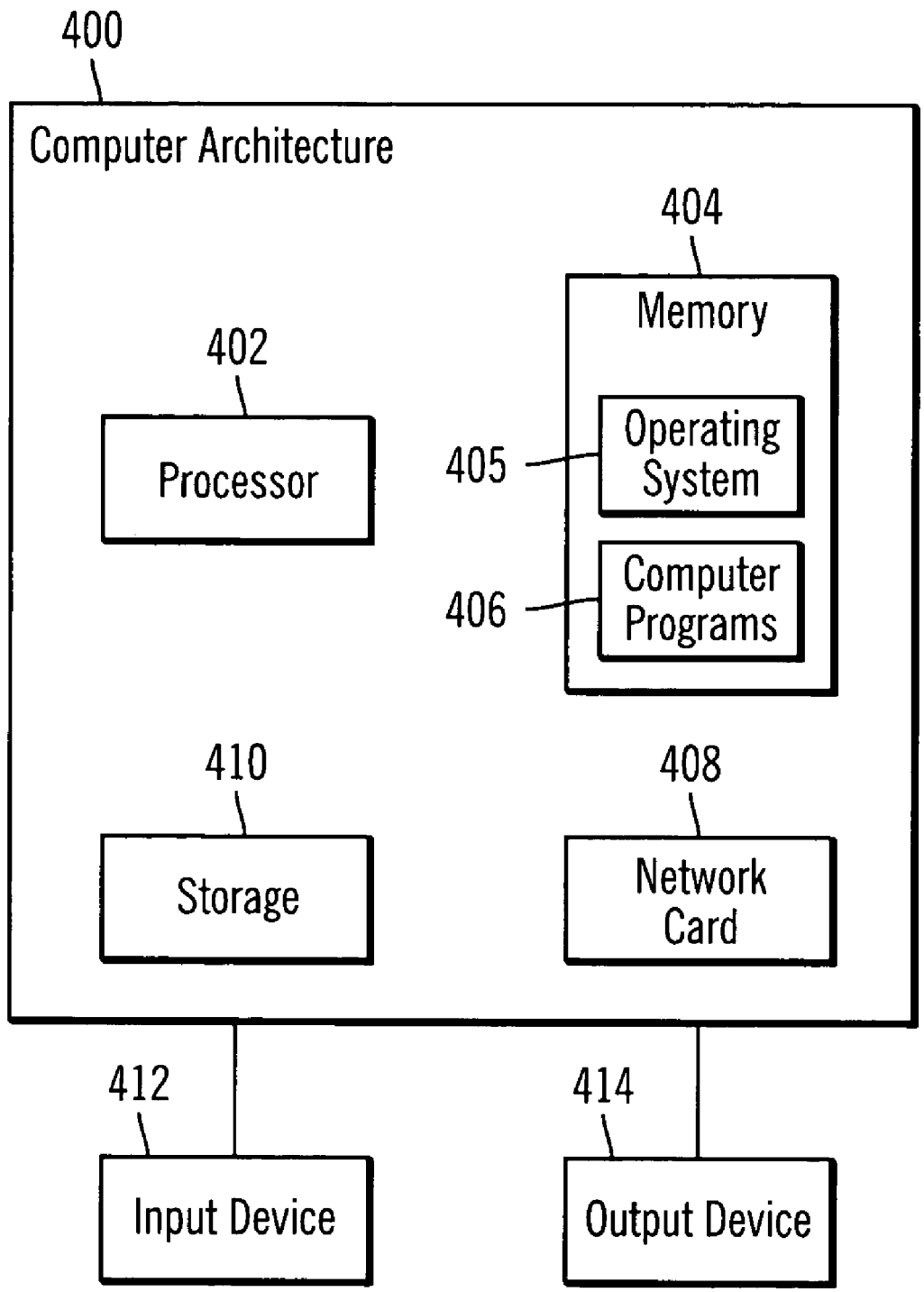
FIG. 4 illustrates an architecture of a computer system that may be used in accordance with certain implementations of the invention.

FIG. 4 illustrates an architecture of a computer system that may be used in accordance with certain implementations of the invention. For example, client computer 100, server computer 120, and/or operator console 180 may implement computer architecture 400. The computer architecture 400 may implement a processor 402 (e.g., a microprocessor), a memory 404 (e.g., a volatile memory device), and storage 410 (e.g., a non-volatile storage area, such as magnetic disk drives, optical disk drives, a tape drive, etc.). An operating system 405 may execute in memory 404. The storage 410 may comprise an internal storage device or an attached or network accessible storage. Computer programs 406 in storage 410 may be loaded into the memory 404 and executed by the processor 402 in a manner known in the art. The architecture further includes a network card 408 to enable communication with a network. An input device 412 is used to provide user input to the processor 402, and may include a keyboard, mouse, pen-stylus, microphone, touch sensitive display screen, or any other activation or input mechanism known in the art. An output device 414 is capable of rendering information from the processor 402, or other component, such as a display monitor, printer, storage, etc. The computer architecture 400 of the computer systems may include fewer components than illustrated, additional components not illustrated herein, or some combination of the components illustrated and additional components.

The computer architecture 400 may comprise any computing device known in the art, such as a mainframe, server, personal computer, workstation, laptop, handheld computer, telephony device, network appliance, virtualization device, storage controller, etc. Any processor 402 and operating system 405 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for handling redirects in documents, comprising:
   while generating an index,
   determining a rank for each of the documents, wherein the rank represents an importance of each document relative to the other documents;
   forming at least one equivalence class that includes documents that are connected through a redirect, wherein each equivalence class describes a redirect chain;
   detecting cycles for each equivalence class, wherein documents in a cycle are marked so that they are not indexed, and, wherein, for each equivalence class, the cycle is formed when a last document in the redirect chain redirects to a first document in the redirect chain;
   detecting incomplete chains for each equivalence class, wherein documents in an incomplete chain are marked so that they are not indexed, and, wherein, for each equivalence class, the indirect chain is formed when a last document in the redirect chain redirects to a document that has not been crawled;
   selecting a representative for each equivalence class whose documents are to be indexed, wherein the representative is associated with a path that indicates a location of a document in a data store;
   detecting duplicate documents in two different equivalence classes; and
   merging the equivalence classes.

2. The method of claim 1, wherein the representative is selected based on a type of redirect in an equivalence class.

3. The method of claim 1, wherein the representative is selected based on the rank of each document in the equivalence class.

4. The method of claim 1, further comprising:
   locating each document that contains a redirect; and
   creating an entry in a redirect file for each document.

5. The method of claim 4, wherein the entry includes a source path, a target path, and a redirect type.

6. The method of claim 1, wherein documents are duplicates if a certain portion of their content is similar.

7. The method of claim 1, wherein the documents in the at least one equivalence class include a target document and one or more source documents and wherein the selected representative is one of the source documents, further comprising:
   propagating the content of the target document to the selected representative.

8. The method of claim 1, wherein the documents in the at least one equivalence class include a target document and one or more source documents, and wherein at least one source document includes a path to the target document.

9. The method of claim 8, further comprising:
   indexing the content of the target document with a path of the representative.

10. The method of claim 1, wherein marking documents so that they are not indexed includes marking documents to indicate the documents are to be ignored.

11. An article of manufacture comprising one of hardware logic and a computer readable storage medium including a program for handling redirects in documents, wherein the hardware logic or program causes operations to be performed, the operations comprising:

while generating an index,
  determining a rank for each of the documents, wherein the rank represents an importance of each document relative to the other documents;
  forming at least one equivalence class that includes documents that are connected through a redirect, wherein each equivalence class describes a redirect chain;
  detecting cycles for each equivalence class, wherein documents in a cycle are marked so that they are not indexed, and, wherein, for each equivalence class, the cycle is formed when a last document in the redirect chain redirects to a first document in the redirect chain;
  detecting incomplete chains for each equivalence class, wherein documents in an incomplete chain are marked so that they are not indexed, and, wherein, for each equivalence class, the indirect chain is formed when a last document in the redirect chain redirects to a document that has not been crawled;
  selecting a representative for each equivalence class whose documents are to be indexed, wherein the representative is associated with a path that indicates a location of a document in a data store;
  detecting duplicate documents in two different equivalence classes; and
  merging the equivalence classes.

12. The article of manufacture of claim 11, wherein the representative is selected based on a type of redirect in an equivalence class.

13. The article of manufacture of claim 11, wherein the representative is selected based on the rank of each document in the equivalence class.

14. The article of manufacture of claim 11, wherein the operations further comprise:
  locating each document that contains a redirect; and
  creating an entry in a redirect file for each document.

15. The article of manufacture of claim 14, wherein the entry includes a source path, a target path, and a redirect type.

16. The article of manufacture of claim 11, wherein documents are duplicates if a certain portion of their content is similar.

17. The article of manufacture of claim 11, wherein the documents in the at least one equivalence class include a target document and one or more source documents and wherein the selected representative is one of the source documents, wherein the operations further comprise:
  propagating the content of the target document to the selected representative.

18. The article of manufacture of claim 11, wherein the documents in the at least one equivalence class include a target document and one or more source documents, and wherein at least one source document includes a path to the target document.

19. The article of manufacture of claim 18, wherein the operations further comprise:
  indexing the content of the target document with a path of the representative.

20. The article of manufacture of claim 11, wherein the operations for marking documents so that they are not indexed include operations for marking documents to indicate the documents are to be ignored.

21. A computer system including logic for handling redirects in documents, comprising:
  a processor; and
  while generating an index,
    determining a rank for each of the documents, wherein the rank represents an importance of each document relative to the other documents;
    forming at least one equivalence class that includes documents that are connected through a redirect, wherein each equivalence class describes a redirect chain;
    detecting cycles for each equivalence class, wherein documents in a cycle are marked so that they are not indexed, and, wherein, for each equivalence class, the cycle is formed when a last document in the redirect chain redirects to a first document in the redirect chain;
    detecting incomplete chains for each equivalence class, wherein documents in an incomplete chain are marked so that they are not indexed, and, wherein, for each equivalence class, the indirect chain is formed when a last document in the redirect chain redirects to a document that has not been crawled;
    selecting a representative for each equivalence class whose documents are to be indexed, wherein the representative is associated with a path that indicates a location of a document in a data store;
    detecting duplicate documents in two different equivalence classes; and
    merging the equivalence classes.

22. The computer system of claim 21, wherein the representative is selected based on a type of redirect in an equivalence class.

23. The computer system of claim 21, wherein the representative is selected based on the rank of each document in the equivalence class.

24. The computer system of claim 21, wherein the logic further comprises:
  locating each document that contains a redirect; and
  creating an entry in a redirect file for each document.

25. The computer system of claim 24, wherein the entry includes a source path, a target path, and a redirect type.

26. The computer system of claim 21, wherein documents are duplicates if a certain portion of their content is similar.

27. The computer system of claim 26, wherein the documents in the at least one equivalence class include a target document and one or more source documents and wherein the selected representative is one of the source documents, wherein the logic further comprises:
  propagating the content of the target document to the selected representative.

28. The computer system of claim 21, wherein the documents in the at least one equivalence class include a target document and one or more source documents, and wherein at least one source document includes a path to the target document.

29. The computer system of claim 28, wherein the logic further comprises:
  indexing the content of the target document with a path of the representative.

30. The computer system of claim 21, wherein marking documents so that they are not indexed includes marking documents to indicate the documents are to be ignored.

* * * * *